A. K. WILLIAMS.
DRAFT-EQUALIZERS.
No. 195,735. Patented Oct. 2, 1877.
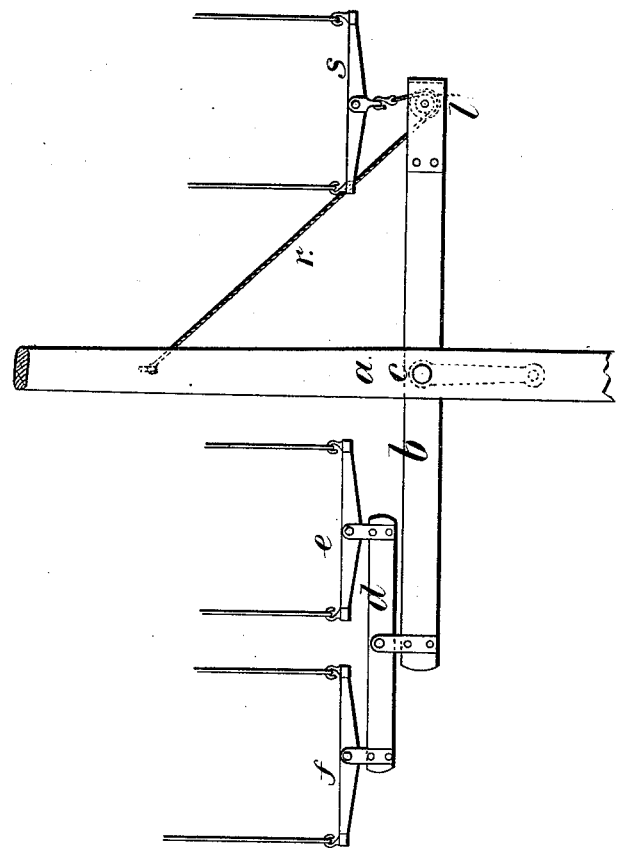
Witnesses,
Chas. H. Smith
William G. Mott
Inventor
Allan K. Williams,
per Lemuel W. Serrell
Atty

UNITED STATES PATENT OFFICE.

ALLAN K. WILLIAMS, OF ROCHESTER, MINNESOTA.

IMPROVEMENT IN DRAFT-EQUALIZERS.

Specification forming part of Letters Patent No. 195,735, dated October 2, 1877; application filed August 28, 1877.

*To all whom it may concern:*

Be it known that I, ALLAN K. WILLIAMS, of Rochester, in the State of Minnesota, have invented an Improvement in Three - Horse Equalizers, of which the following is a specification:

Numerous devices have been made for equalizing the draft of horses when two are placed at one side of the pole or tongue and one at the other side, and in some of these devices chains and pulleys are made use of.

My improvement is for simplifying the construction and allowing one horse to be close to the pole, so that with harvesters the machine may be run close to the standing grain to cut the whole width of the cutter-bar.

I employ a single-tree or evener attached, at or near its center, to the pole, and at one end are the double whiffletrees for two horses, fitted in the usual manner, but at the other end of the evener there is a pulley, and a chain or rope from the whiffletree of the third horse is passed around behind the sheave of the said pulley, and led forward and attached to the pole or tongue to produce a double purchase, and thereby cause the pull of one horse at one end of the evener to balance the pull of two horses at the other end of the evener.

In the drawing I have shown my improvement by a plan view.

The tongue or pole $a$, single-tree or evener $b$, attached by the fulcrum $c$, the secondary evener $d$, and two whiffletrees, $e$ and $f$, are similar to those that have been employed before where two horses have been at one side of the pole or tongue.

I improve the three-horse evener heretofore used by placing a pulley or sheave, $l$, at the end of the evener $b$, and passing a chain or rope, $r$, from the third whiffletree $s$, around such pulley $l$, and leading the same forward and attaching it to the tongue or pole $a$.

By this construction it will be seen that the pull of one horse acts with double effect, in consequence of the pulley $l$ moving half the distance of the whiffletree $s$ when there is any change in the position of the parts; hence there is a balanced action between the one horse at one side of the tongue and the two horses at the other side of the tongue or pole.

The apparatus is very simple, and there are not any parts that are liable to become misplaced or injured.

I claim as my invention—

In a three - horse evener, the combination, with the single-trees and whiffletree for the two horses, of a whiffletree for the third horse, a rope or chain, a pulley near the end of the evener $b$, and an attachment upon the pole for the rope or chain that passes forward from the pulley, substantially as set forth.

Signed by me this 22d day of August, 1877.

ALLAN K. WILLIAMS.

Witnesses:
F. E. GOODING,
JAMES M. WILLIAMS.